United States Patent [19]

Smeyak et al.

[11] Patent Number: 5,800,764
[45] Date of Patent: Sep. 1, 1998

[54] EXTERNAL VENTING METHOD FOR FORMING CLOSURE LINERS

[75] Inventors: Lawrence M. Smeyak, Lafayette; Alex I. Lerner, Zionsville, both of Ind.

[73] Assignee: Alcoa Closure Systems International, Inc., Crawfordsville, Ind.

[21] Appl. No.: 578,143

[22] Filed: Dec. 26, 1995

[51] Int. Cl.[6] .................................................. B29C 43/04
[52] U.S. Cl. ........................................ 264/268; 425/809
[58] Field of Search .............................. 264/268; 425/809

[56] References Cited

U.S. PATENT DOCUMENTS

| | | | |
|---|---|---|---|
| 3,828,963 | 8/1974 | Moller | 215/337 |
| 4,312,824 | 1/1982 | Mori et al. | 264/135 |
| 4,343,754 | 8/1982 | Wilde et al. | 264/154 |
| 4,398,875 | 8/1983 | Kawashima et al. | 425/127 |
| 4,497,765 | 2/1985 | Wilde et al. | 264/268 |
| 4,755,125 | 7/1988 | Takeda et al. | 425/576 |
| 4,776,782 | 10/1988 | Murayama et al. | 425/149 |
| 5,650,113 | 7/1997 | Gregory et al. | 264/238 |

*Primary Examiner*—Thomas R. Weber
*Attorney, Agent, or Firm*—Dressler, Rockey, Milnamow & Katz, Ltd.

[57] ABSTRACT

A method for forming a liner in a closure for a container includes forming a plastic closure cap having a circular top wall portion and a depending annular skirt portion depending from the top wall portion, and depositing a quantity of moldable liner forming plastic material in the cap. A liner forming assembly which has a liner tip and a liner sleeve, the liner tip being axially movable relative to said liner sleeve, and the liner sleeve defining a plurality of circumferentially located, radially oriented venting channels positioned on an outer surface thereof, is advanced into the cap to engage the sleeve with the cap, adjacent to the venting channels, to define a liner space. The liner tip is advanced into the cap, relative to the liner sleeve, to compress a liner forming material to form the liner while restraining the flow of moldable plastic between the sleeve and the cap, and while venting gas out of the liner space through the venting channels.

10 Claims, 3 Drawing Sheets

EXTERNAL VENTING METHOD FOR FORMING CLOSURE LINERS

FIELD OF THE INVENTION

This invention pertains to a method for forming container closure liners and more particularly to a method for forming liners for container closures in which the gas is vented externally of the liner forming tool during liner formation.

BACKGROUND OF THE INVENTION

Closures for containers such as those used for bottling soft drinks are well known in the art. One such commonly used closure is formed of plastic and includes a circular top wall portion and an internally threaded depending skirt portion which threads onto an associated container. For enhanced sealing, many such closures include a liner positioned on the inside surface of the top wall.

Examples of such closures and methods of making such closures are disclosed in U.S. Pat. Nos. 5,205,426 to McBride et al. and 4,497,765 to Wilde et al, hereby incorporated by reference.

In particular, carbonated beverages, such as soda pop, which develop an internal pressure, require an aggressive seal which withstands the internally developed pressure, as well as maintains its integrity in the flexure and movement of the closure cap during shipping and storage. Such seals must also be capable of resealing after initial removal of the closure from the container.

To accommodate such internal pressures as well as the rigors of shipping and storage, various compressible liners have been developed.

The aforementioned U.S. Pat. No. 4,497,765 to Wilde et al., discloses a method of forming a liner within a closure cap, commonly referred to as a "molded-in" liner. In such a process, a quantity of moldable liner-forming plastic is deposited on the inner surface of the closure top wall portion. A liner forming assembly, which includes a liner-forming plunger or liner tip disposed coaxially in a lining sleeve, is then advanced into the closure to form the sealing liner by applying pressure to the liner-forming plastic and molding the liner in place in the closure.

In one known type of liner forming apparatus, as illustrated in FIGS. 2-4, the lining sleeve includes inner and outer sleeves $S_i$ and $S_o$ coaxially disposed one with the other, and a having a small gap G therebetween. The sleeves move as a single unit, with a liner tip T movable axially, relative to the sleeves.

When the assembly is positioned in the cap, the outer sleeve engages a liner retaining lip formed in the cap. The plunger is then advanced through the inner sleeve and into the cap, to force the liner material M radially outwardly, to fill the space between the liner tip, the sleeves and the cap. As best illustrated in FIG. 4, gas or air which is trapped in the liner space is forced out as the liner material flows outwardly to fill the space, which gas or air is vented through the gap between the inner and outer sleeves. In such known assemblies, the gap between the inner and outer sleeves is small, generally less than 0.0015 inches (0.15 mils). The relatively small size of the gap is necessary to prevent the liner forming material from flashing into the gap between the sleeves.

One disadvantage to this design is that the air vent gap is located along the surface of the liner forming geometry rather than at the edge of the liner forming geometry. As a result, the liner material, as it flows outward to form the liner, may also flow into the vent gap and reduce or block the flow path for venting. Another disadvantage is that many of the liner forming materials which are presently used contain lubricants or plasticizers which eventually reach the vent gap and may accumulate to further block the air vent path. Still another disadvantage of the known liner forming tool designs is the relatively long passageway between the sleeves which forms the vent path.

Those skilled in the art will recognize the need for adequate venting during such compression molding processes. In order for the material to properly flow into and conform to the compressing tools' surfaces and the surfaces of the closure, the air or gas present must be displaceable by the flowing plastic material. Thus, a vent path or vent paths must be provided.

When the air or gas cannot adequately vent from the flow area, which may be due to partial or complete blockage of the vent paths, the air or gas may become trapped and forced into the body of the liner, forming inconsistencies, such as voids, bubbles or depressions therein. These inconsistencies can, in turn, adversely effect the ability of the liner to form and retain a seal.

Blockage in the air vent path requires that the forming assembly be taken out of service and disassembled for cleaning. The known liner forming assemblies include thin-walled sleeves manufactured under very close tolerances. In many such assemblies, the sleeves are press-fit together to form the unitary sleeve assembly. These highly machined sleeves are not, generally, designed to be continually disassembled and reassembled. Moreover, due to the nature of the assembly, and the internal location of the vent gap, disassembly, cleaning and reassembly (i.e., repress-fitting) can be time consuming and may result in required rework or damage to the assembly components.

Thus, there continues to be a need for a closure liner forming tool and method which can provide adequate venting capabilities during liner formation, which is relatively self cleaning, and which, when necessary, can be cleaned with minimal disassembly of the liner forming tool assembly.

SUMMARY OF THE INVENTION

A method for forming a liner in a closure for a container includes forming a plastic closure cap having a circular top wall portion and a depending annular skirt portion depending from the top wall portion, and depositing a quantity of moldable plastic in the cap. A liner forming assembly is provided which has a liner tip and a liner sleeve, the liner tip being axially movable relative to said liner sleeve. The liner sleeve has a plurality of circumferentially located, radially oriented venting channels positioned on an outer surface thereof.

The assembly is advanced into the cap to engage the sleeve with the cap, adjacent to the venting channels, to define a liner space. The liner tip is advanced into the cap, relative to the liner sleeve, to compress the moldable plastic to form the liner while restraining the flow of moldable plastic between the sleeve and the cap, and while venting gas out of the liner space through the venting channels at the edge of the liner forming geometry.

An externally venting liner forming tool for forming the liner in an associated closure cap includes a sleeve having an outer surface and a first end, and defining a bore therethrough. The sleeve includes at least one advancement stop member extending circumferentially from the outer surface at about a juncture with the first end. The sleeve further includes a plurality of venting passages extending from about the first end, across at least one advancement stop member and into the outer surface.

The tool further includes a liner tip coaxially disposed in the sleeve, which is adapted to be slidably received in the bore. The tip is slidable between a first position and a second position wherein the tip extends beyond the first end.

The sleeve is positionable in the cap with the advancement stop member in engagement with the cap, defining a liner space. The liner tip is advanceable to the second position to compress a moldable plastic liner forming material between the top wall portion, the liner tip and the sleeve. Gas which is in the liner space is vented therefrom to a region external of the sleeve.

Other features and advantages of the present invention will be apparent from the following detailed description, the accompanying drawings, and the appended claims.

DETAILED DESCRIPTION OF THE PREFERRED EMBODIMENTS

Figure 1:
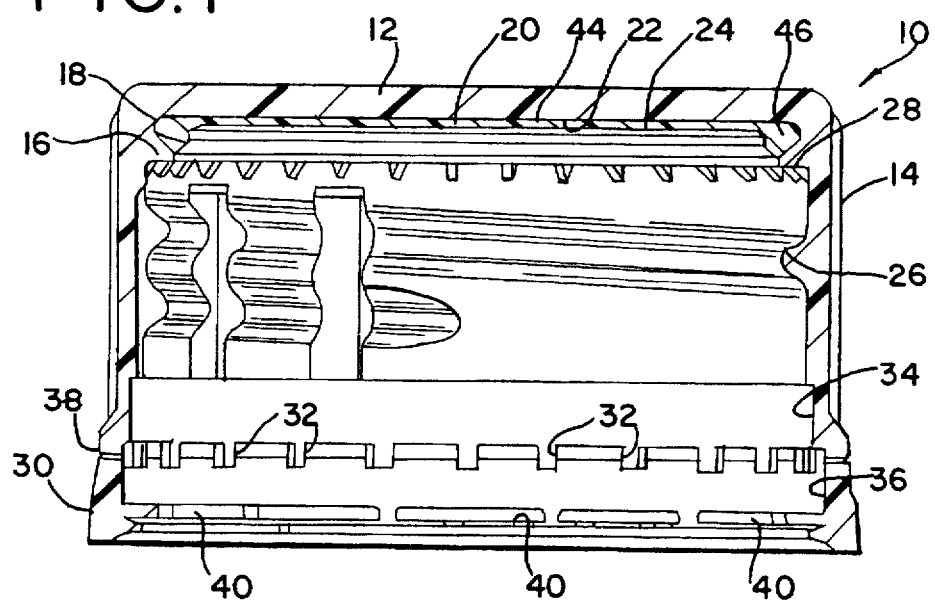
FIG. 1 is a cross-sectional view of an exemplary closure cap, illustrated with a molded-in liner formed therein.
Figure 2:
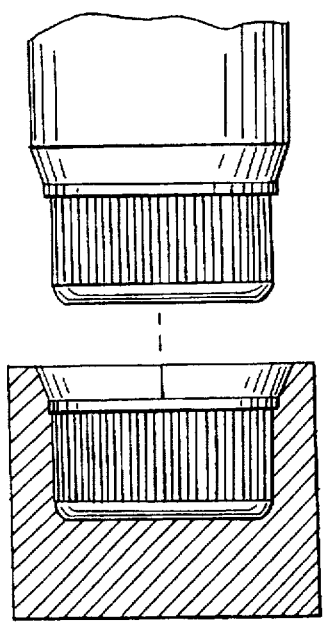
FIG. 2 is a side elevational view, in partial cross-section, of a tooling assembly for forming a closure cap.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Figure 3:
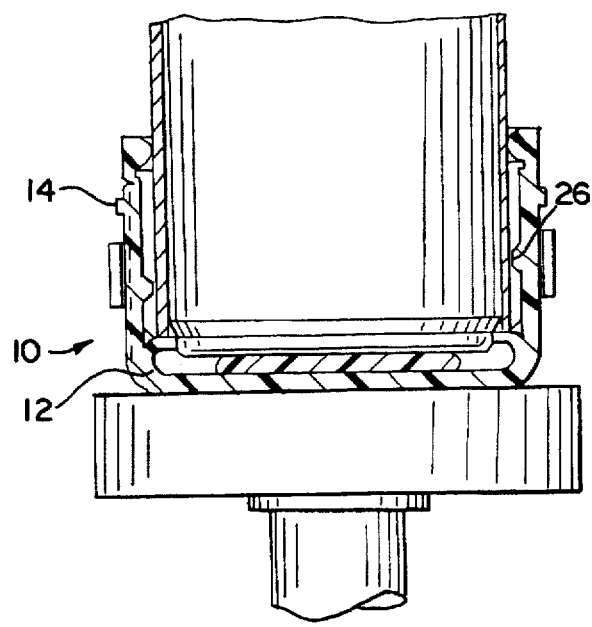
FIG. 3 is a side elevational view, in partial cross-section, of a known, two-sleeve, internally venting tooling assembly for forming a closure liner.
Figure 4:
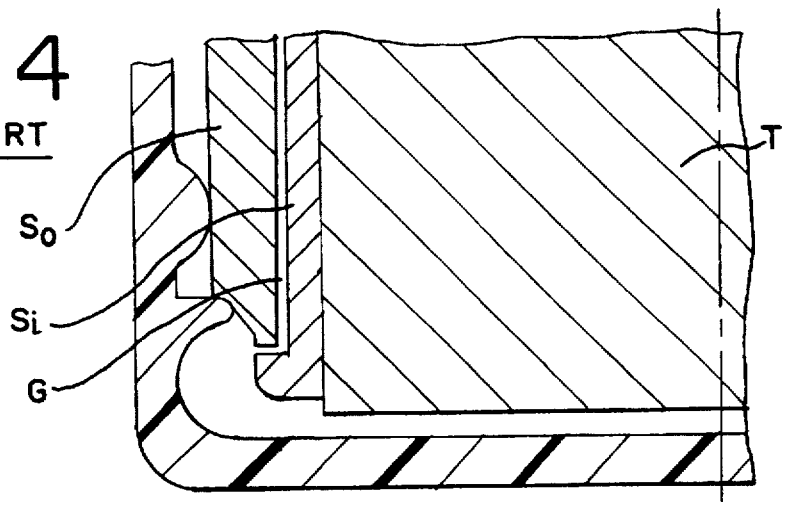
FIG. 4 is a partial cross-sectional view of the two-sleeve, internally venting tooling assembly of FIG. 3, illustrated with the liner tip in an extended position.
Figure 5:
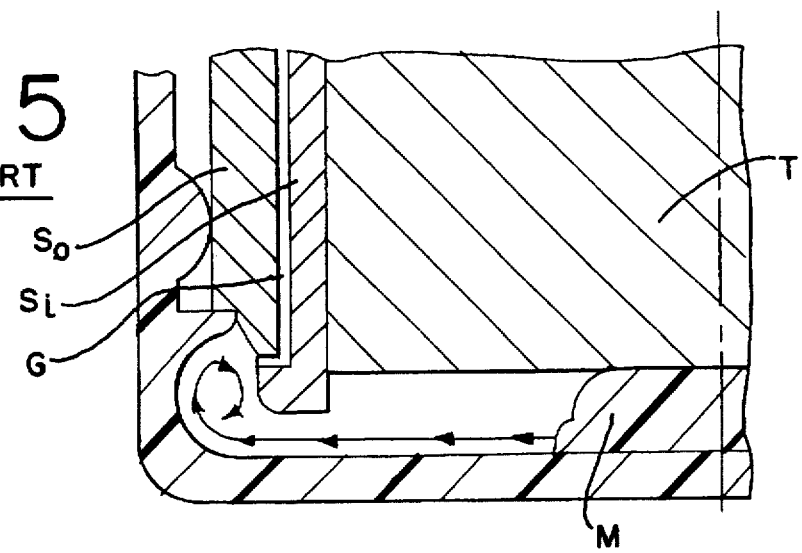
FIG. 5 is a view similar to FIG. 4, illustrating the vent path for gas within the liner space during liner formation.
Figure 6:
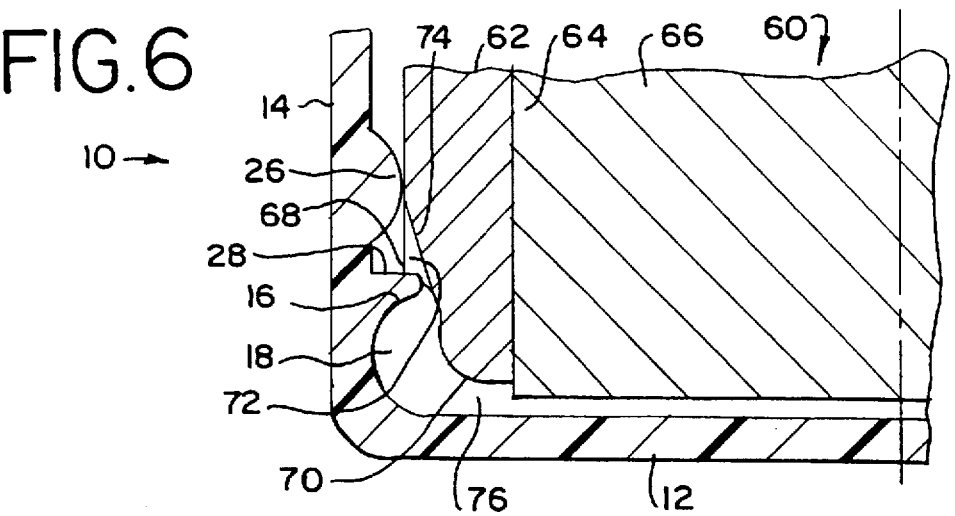
FIG. 6 illustrates the externally venting liner forming method and tool in accordance with the principles of the present invention, in which the sleeve is positioned in the associated closure cap and the liner tip is shown in the extended position.

Referring now to FIG. 1, there is shown a container closure 10 which is used with an associated container (not shown). The closure 10 includes a circular top wall portion 12 and a depending annular skirt portion 14, which depends from the top wall portion 12. The closure further includes an annular liner retaining member 16 at about a juncture of the top wall portion 12 and the depending skirt portion 14. In the embodiment illustrated in FIG. 1, the retaining member 16 includes a lip which defines an annular recess 18 adjacent the top wall portion 12. The retaining member 16 may ultimately be configured such as that illustrated in U.S. Pat. No. 5,265,747 to Gregory et al., indicated at 25 in FIGS. 3–5 of the Gregory et al. patent, which patent is incorporated by reference herein.

The closure 10 includes a liner 20 therein, positioned adjacent to the top wall portion 12 of the closure 10. The liner 20 has a first side 22 which is adjacent to the top wall portion 14 and a second side 24 which faces inward of the closure 10.

In a preferred embodiment of the closure 10, the depending skirt portion 14 includes an internal thread formation 26 on the inside thereof for threadedly engaging a thread (not shown) on the associated container to which the closure 10 is fitted. The retaining member 16 and closure thread 26 define a circumferential ridge 28, internal of the closure 10, adjacent to the recess 18.

In one embodiment, the closure 10 is formed with a tamper-evident pilfer band 30 to provide visibly discernible evidence that the closure 10 has been partially or completely removed from the container.

The pilfer band 30 is connected to the skirt portion 14 by a plurality of rib-ike bridges 32 which extend between the inside surfaces 34, 36 of the skirt portion 14 and the pilfer band 30. The pilfer band 30 is otherwise separated and distinguished from the skirt portion 14 by a circumferential score line 38 which extends through the side wall of the closure 10 and partially into the frangible ribs 32.

The pilfer band 30 can be configured in accordance with the teachings of the aforementioned U.S. Patent to McBride et al. and U.S. Pat. No. 4,938,370 to McBride, and formed attendant to compression molding of the closure 10 according to the teachings of the aforementioned U.S. Patent to Wilde et al., which patents are commonly assigned herewith and which patents are incorporated by reference herein.

In the exemplary closure 10, the pilfer band 30 has a plurality of inwardly extending tabs 40. Upon initial engagement of the closure 10 to the container, the tabs 40 pivot in an upward manner and pass over an annular locking ring (not shown) of the container. Pilfer indication is provided upon first removal of the closure 10 from the container wherein the tabs 40 engage the locking ring which provides sufficient resistance to separate the pilfer band 30 from the skirt portion 14 at the score line 38.

The liner 20 includes a central portion 44 and a relatively thick annular bead-like portion 46, which bead-like portion 46 is formed at about the juncture of the retaining member 16 and the top wall portion 12. The liner 20 shown is of the molded-in type, that is, it is formed in the closure 10, rather than formed external thereto and subsequently assembled into the closure 10. In the illustrated embodiment, the bead-like portion 46 extends into the recess 18 and helps to retain the liner 20 in place in the closure 10. The bead-like portion 46, as well as the central portion 44, may be configured to form a part of the seal between the closure 10 and the container.

Figure 7:
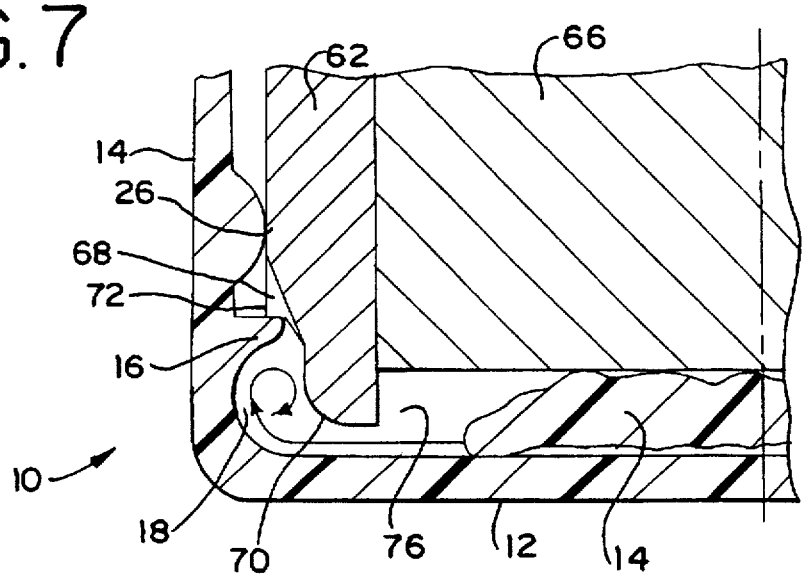
FIG. 7 illustrates the sleeve and liner tip positioned in the associated closure cap, with the liner tip advancing into the cap to compress the moldable liner-forming plastic, and the flow path of gas venting from the liner space.
Figure 8:
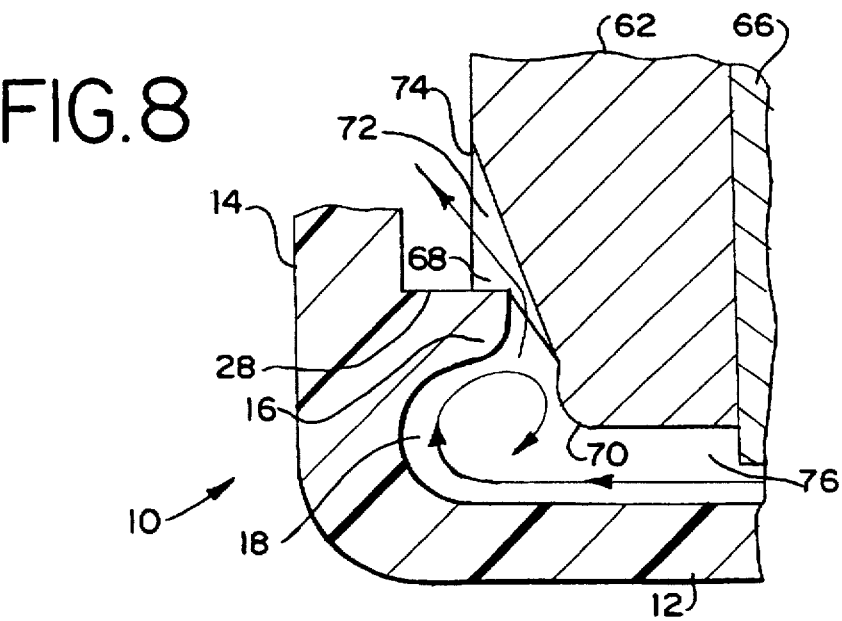
FIG. 8 is a view similar to FIG. 7, in which the gas is illustrated venting from the liner space, externally of the liner sleeve.

FIGS. 7–8 illustrate the formation of a liner 20 in accordance with the principles of the present invention. The illustrated closure 10 includes the top wall portion 12, the depending skirt portion 14, and the lip 16 formed therebetween. The lip 16 defines the recess 18 adjacent the top wall portion 12 and the ridge 28 adjacent the thread 26.

A liner forming assembly 60 is positioned in, and advanced into, the closure 10. The assembly 60 includes a liner sleeve 62 which defines a bore 64 therethrough, and a liner forming tip 66, which is coaxial with, and slidably positioned within the sleeve 62.

The sleeve 62 further includes a circumferential advancement stop or shoulder region 68 which is set back from the end 70 of the sleeve 62. The shoulder region 68 defines means for directly venting a gas to an area external of the sleeve 62. In one embodiment, the venting means are provided by a plurality of venting passages 72 formed in an outer surface 74 thereof. In a preferred embodiment, the venting passages include radially oriented venting channels. Otherwise oriented passages or channels may be used to provide such venting means extending from about the end portion 70, across the shoulder 68, to the area external of the sleeve 62.

In one configuration, the sleeve 62 includes thirty six (36) channels 72, each circumferentially spaced 10° apart from its adjacent channels 72. Each channel 72 is about 0.0025 inches (0.25 mils) wide, across the face of the sleeve 62, and about 0.013 inches (1.3 mils) deep, into the body of the sleeve 62. The channels 72 may be formed by methods such as grinding, with for example, a high speed, narrow grinding wheel, electro-discharge machining (EDM) or the like.

Formation of the liner 20 is accomplished by depositing a predetermined quantity of moldable plastic liner material M in the closure cap 10. The liner forming assembly 60 is advanced into the cap 10, such that the shoulder region 68 engages the circumferential ridge 28 in the cap, the ridge 28 providing an engagement region for the shoulder 68. With the sleeve 62 in place, and the shoulder region 68 engaging the circumferential ridge 28, a liner space 76 is defined in the closure 10 bounded by the assembly 60, the top wall portion 12 and the lip 16.

As is best seen in FIG. 7, the venting channels 72 provide a vent path between the liner space 76 and the environs external of the sleeve 62. Thus, as the liner tip 66 is advanced into the closure 10, relative to the sleeve 62, to compress the liner material M, air or gas which was otherwise trapped in the liner space 76, is driven out of the space 76 through the venting channels 72, at the edge of the liner forming geometry, by the outwardly flowing liner material M.

It will be recognized by those skilled in the art that venting of the air or gas from the liner space is an important consideration for proper liner formation. As previously discussed, if the air or gas is not properly vented, inconsistencies may form in the liner 20 where the air or gas is forced into the body of the liner 20, rather than being permitted to escape from the liner space. These inconsistencies may take the form of voids, depressions or bubbles in the liner 20, which, in turn, may have an averse effect on the ability of the liner 20 to properly seal the container.

The location of the venting channels 72 at the shoulder region 68, advantageously positions the channels 72 at the edge of the liner flow path or the liner forming geometry. One beneficial aspect of this positioning is that the liner material M is less inclined to block or impede the vent path, thus, providing sufficient vent flow area for proper liner 20 formation. Moreover, venting occurs at the front of the liner material M flow path, rather than at a location along the profile of the flowing material.

Another beneficial aspect of the location of the vent channels 72 is that the vent area is on an external surface of the liner forming assembly 60, rather than internal to the tool. Unlike known liner forming assemblies, the present forming assembly 60 is more easily cleaned because disassembly of the device is not required to access the vent area surfaces. As previously discussed, lubricants and plasticizers in the moldable liner plastic may, over time, accumulate and block the vent area, thus impeding good venting during liner formation. The present liner forming method and assembly 60 readily facilitates cleaning the tooling surfaces because they are external to the assembly 60. Moreover, venting is directed away from, rather than through a long path in the assembly 60. This configuration further reduces the opportunity for lubricants and plasticizers to collect on the assembly's venting surfaces.

During the liner forming process, it is not uncommon for the liner forming assembly 60 to be inserted into and withdrawn from the closure cap 10 hundreds of times per minute. Thus, the assembly 60 is subjected to high repetitions of reciprocation.

Advantageously, the present externally venting liner forming assembly 60 is essentially self-cleaning, because the region of the sleeve 62, over which the gas or air from the liner space 76 flows, comes into contact with the threads 26 of closure cap 10 as the sleeve 62 is inserted into and withdrawn from the closure 10. The contact between the sleeve 62 and the threads 26 tends to wipe the sleeve 62 clean of any small amounts of lubricants or plasticizers which may have accumulated thereon.

Still another advantage of the present assembly 60 is that any flashing of the liner forming material M which may occur would be outside of the seal diameter of the liner 20, that is, outside of the seal area. Thus, the opportunity for formation of interferences which could adversely effect the seal between the closure 10 and the associated container are greatly reduced or even eliminated.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A method for forming a liner in a closure for a container comprising:

forming a plastic closure cap having a circular top wall portion and a depending annular skirt portion depending from the top wall portion;

depositing a quantity of moldable plastic in said cap;

providing a liner forming assembly having a liner tip and a liner sleeve, said liner tip being axially movable relative to said liner sleeve, said liner sleeve having a plurality of circumferentially spaced apart, radially oriented venting passages positioned on an outer surface thereof;

advancing said assembly into said cap to engage said sleeve, adjacent to said venting passages, with said cap, to de a liner space; and advancing said liner tip into said cap, relative to said liner sleeve, to compress said moldable plastic to form said liner while restraining the flow of moldable plastic between said sleeve and said cap, and while venting gas out of said liner space through said venting passages as said moldable plastic flows into said liner space.

2. The method as in claim 1, wherein said cap includes an annular liner retaining member at about a juncture between said top wall portion and said skirt portion, and including the step of advancing said sleeve into said cap adjacent said retaining member to compress said moldable plastic between said sleeve and said retaining member, and while venting gas out of said liner space through said venting passages.

3. The method of claim 2 wherein said annular liner retaining member includes a liner retaining lip.

4. The method of claim 3 wherein said lip defines an annular recess adjacent said top wall portion.

5. The method of claim 2 wherein said venting occurs adjacent said annular liner retaining member.

6. The method of claim 5 wherein said liner forming assembly further includes an advancement stop member, said venting passages being formed in said stop member, and including the step of advancing said sleeve into said cap to engage said stop member with said liner retaining member.

7. The method of claim 2 wherein said liner retaining member defines, at least in part, at least one of said plurality of venting passages.

8. A method for forming a liner in a closure for a container comprising:

forming a plastic closure cap having a circular top wall portion and a depending annular skirt portion depending from the top wall portion;

depositing a quantity of moldable plastic in said cap;

providing an externally venting liner forming assembly having a liner tip and a liner sleeve, said liner tip being axially movable relative to said liner sleeve, said liner sleeve having circumferentially spaced apart venting means for directly venting a gas to an area external of said sleeve;

advancing said assembly into said cap to engage said sleeve with said cap, to define a liner space; and advancing said liner tip into said cap, relative to said liner sleeve, to compress said moldable plastic to form said liner while restraining the flow of moldable plastic between said sleeve and said cap, and while venting gas out of said liner space to the area external of said sleeve as said moldable plastic flows into said liner space.

9. The method as in claim 8 wherein said venting means is located at a region where said liner sleeve engages said cap.

10. The method as in claim 8 wherein said liner forming assembly defines an axially oriented central axis therethrough, and wherein said venting occurs at a region on said sleeve furthest from said central axis.

* * * * *